United States Patent

Tarsha

[11] 3,862,646
[45] Jan. 28, 1975

[54] COMBINED FILLING TUBE AND PRESSURE INDICATOR

[75] Inventor: Manuel A. Tarsha, Santa Ana, Calif.

[73] Assignee: Parker-Hannifin Corporation, Cleveland, Ohio

[22] Filed: Dec. 17, 1973

[21] Appl. No.: 424,952

[52] U.S. Cl. .................. 138/104, 116/70, 137/227, 138/31
[51] Int. Cl. ........................ G01l 23/32, F16k 37/00
[58] Field of Search ............ 116/34 R, 70; 137/568, 137/227; 138/26, 30, 31, 104; 73/419, 146.8, 146.3

[56] References Cited
UNITED STATES PATENTS

| | | | |
|---|---|---|---|
| 1,473,171 | 11/1923 | Bowden | 73/146.8 |
| 1,807,752 | 6/1931 | Poster | 73/419 X |
| 1,875,732 | 9/1932 | Holttum | 138/104 X |
| 2,676,605 | 4/1954 | Meredew | 138/30 X |
| 3,260,233 | 7/1966 | Bergunder | 116/34 R |
| 3,529,835 | 9/1970 | Lewis | 138/104 X |
| 3,780,693 | 12/1973 | Parr | 116/70 |

Primary Examiner—Jerry W. Myracle
Assistant Examiner—Daniel M. Yasich
Attorney, Agent, or Firm—Donnelly, Maky, Renner & Otto

[57] ABSTRACT

A pressure indicator for indicating absence or existence of a predetermined pressure in a pressure chamber includes first and second different signals respectively indicative of the absence and existence of a predetermined pressure. The indicator is movable for positioning the first signal in a viewing location in the absence of the predetermined pressure, and is movable for positioning the second signal in a viewing location under influence of the predetermined pressure.

9 Claims, 1 Drawing Figure

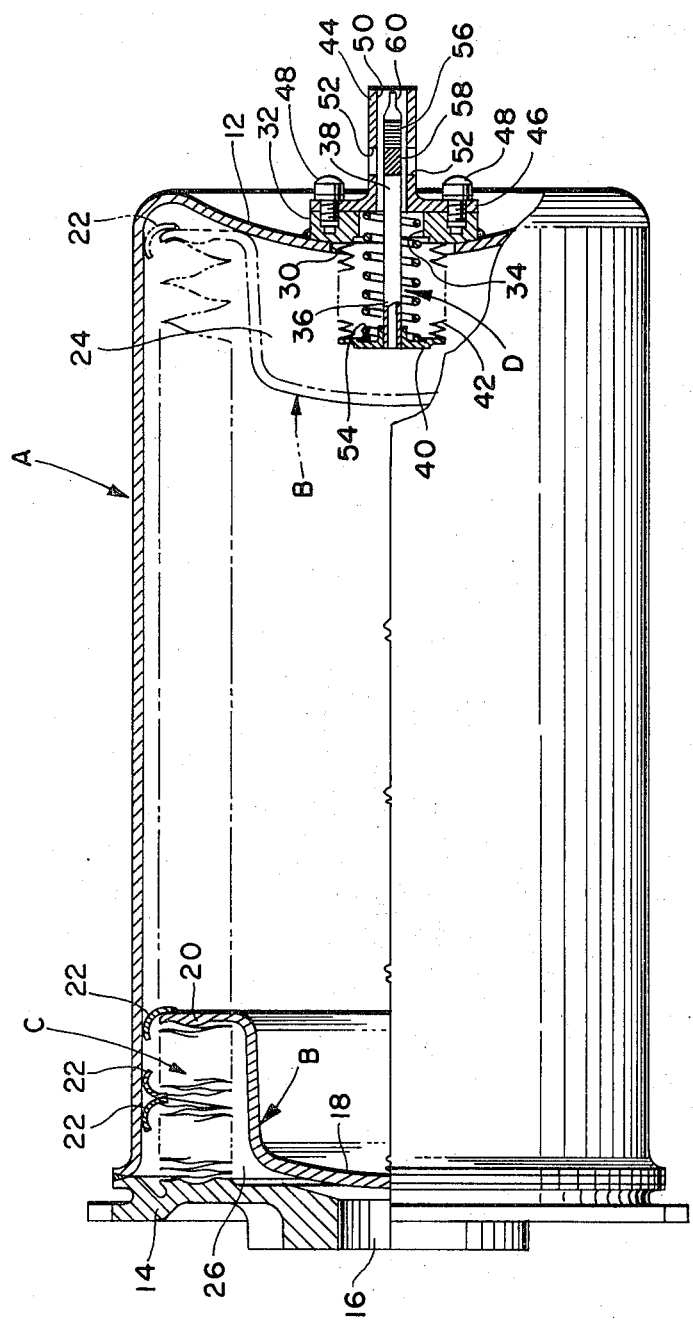

COMBINED FILLING TUBE AND PRESSURE INDICATOR

BACKGROUND OF THE INVENTION

This application pertains to the art of pressure indicators. The invention is particularly applicable to pressure indicators for hydraulic accumulators and will be particularly described with reference thereto. However, it will be appreciated that the invention has broader aspects and may be used with other pressure devices having pressure chambers.

Pressure indicators in general are very old. Such indicators are usually very elaborate and complicated mechanisms or electronic devices for precisely indicating pressures. For certain applications, there is no need for precise indications of pressure over a wide range. Heretofore, there has not been a very simple and low cost indicator which would simply indicate whether a pressure device is charged or is not charged.

SUMMARY OF THE INVENTION

A movable visible indicator for indicating absence or existence of a predetermined pressure in a pressure chamber includes first and second different signals respectively indicative of the absence and existence of the predetermined pressure. The indicator is movable for positioning the first signal in a viewing location in the absence of the predetermined pressure, and is movable for positioning the second signal in a viewing location under influence of the predetermined pressure.

In accordance with one arrangement, the indicator includes an elongated stem reciprocatingly mounted for movement in a first direction inward relative to the pressure chamber and in a second direction outward relative to the pressure chamber. The stem has one stem end portion inside the pressure chamber and an opposite stem end portion outside the chamber. The first and second different signals are on the opposite stem end portion at different longitudinal locations. Biasing means normally biases the stem in the first direction for positioning the first signal in a viewing location in the absence of the predetermined pressure in the pressure chamber. Pressure responsive means is provided on the one stem end portion inside the chamber for response to the predetermined pressure for moving the stem in its second direction for positioning the second signal in a viewing location.

In accordance with a preferred arrangement, the stem comprises a hollow tube through which the chamber is charged to its predetermined pressure. The opposite stem end portion outside of the pressure chamber terminates in an outer tube end which is pinched closed.

In accordance with another aspect of the invention, a hollow sleeve is secured to the pressure device in surrounding relationship to the opposite end portion of the stem. The signals on the stem comprise different color bands and the sleeve has at least one lateral opening therethrough defining the viewing location through which the different bands are visible.

In accordance with another aspect of the device, the pressure responsive means on the one stem end portion includes a disc secured thereto, and a bellows sealingly secured to the disc and to an inner surface of the chamber in surrounding relationship to the one stem end portion.

It is a principal object of the present invention to provide a pressure indicator which is very simple in operation, and very inexpensive to manufacture and assemble.

A further object of the invention is to provide a pressure indicator which simply indicates the absence or existence of a predetermined amount of pressure in a pressure chamber.

A further object of the invention is to use a hollow tube through which a pressure chamber is charged as a pressure indicator.

BRIEF DESCRIPTION OF THE DRAWING

The drawing shows a hydraulic accumulator having the pressure indicator of the present invention incorporated therein, and with portions cut away and in section for clarity of illustration.

DESCRIPTION OF A PREFERRED EMBODIMENT

Referrring now to the drawing, wherein the showings are for purposes of illustrating a preferred embodiment of the invention only and not for purposes of limiting same, a hydraulic accumulator includes a generally cylindrical vessel A having an integral end wall 12. A base member 14 is welded or otherwise secured to the other end of vessel A and includes a centrally located port 16 communicating with the interior of vessel A.

A generally circular piston member B is positioned within vessel A for movement longitudinally thereof between the solid line and shadow line positions. Piston member B includes a generally dished central portion 18 and an outwardly extending circumferential flange 20.

A welded metal bellows C is welded to flange 20 and to the inner surface of base member 14. Circumferentially spaced arcuate guides 22 are welded to flange 20 and to metal bellows C for bearing against the inner surface of vessel A for guiding movement of piston member B, and movement of bellows C as it expands and contracts.

A pressure chamber generally indicated by numeral 24 is defined within vessel A on one side of piston member B. Pressure chamber 24 is chargeable with a predetermined air or gas pressure. A hydraulic chamber generally indicated by numeral 26 is defined on the opposite side of piston member B within bellows C. Pressure chamber 24 is precharged with a certain air or gas pressure. This will generally compress bellows C and move piston B to the solid line position. When the device is installed in a hydraulic system, hydraulic fluid under a pressure greater than the precharge pressure will be supplied through port 16 in base member 14 to hydraulic chamber 26 within bellows C. The pressurized hydraulic fluid will expand bellows C and move piston member B to the shadow line position for compressing the air or gas within pressure chamber 24. When the hydraulic system demands additional hydraulic fluid, the air or gas pressure within pressure chamber 24 acts upon piston member B for shifting it toward the solid line position to expel hydraulic fluid under high pressure through port 16.

End wall 12 has a centrally located hole 30 therein. A support member 32 is welded to end wall 12 and has a central hole 34 coincidental with hole 30. An elongated stem in the form of a hollow tube D extends through holes 30 and 34, and has one stem end portion 36 located within pressure chamber 24, and an opposite end portion 38 located outside of pressure chamber 24. A metal disc 40 is welded or otherwise secured to stem end portion 36. A metal bellow 42 is welded to disc 40 and to the inner surface of support member 32 in surrounding relationship to inner stem end portion 36. A hollow sleeve member 44 has a flange 46 sealingly secured to support member 32 as by bolts 48. Sleeve member 44 has a cylindrical hole 50 therethrough freely receiving opposite stem end portion 38. Sleeve member 44 has at least one lateral opening therethrough, two of which are shown in the drawing at 52. Lateral openings 52 define a viewing location through which opposite stem end portion 38 is visible. A coil spring 54 defines a biasing means and is positioned within bellows 42 in surrounding relationship to stem D to bear against disc 40 and the inner surface of sleeve flange 46 for normally biasing stem D in a first direction inward relative to pressure chamber 24.

Stem D has signal means thereon in the form of first and second different color bands 56 and 58 at different longitudinal locations on opposite stem end portion 38. Band 56 may be red, while band 58 may be green.

With the device assembled as shown and described, tube D may initially be longer than shown. Tube D is then connected through a pressure regulator to a source of pressurized air or gas for charging pressure chamber 24 with a certain pressure. Tube D is then cut off and pinched closed as at 60 for retaining the certain pressure within chamber 24. It will be recognized that it is also possible to initially have tube D of substantially the same length as shown and to connect tube D through a pressure regulator with a pressurized source of air or gas before sleeve 44 is mounted on support 32. Subsequent to charging chamber 24 with a certain pressure and pinching tube D closed at 60, spring 54 may be positioned around stem D within bellows 42 and sleeve 44 then assembled in the manner shown.

With chamber 24 charged to a certain pressure, piston member B will normally move to the solid line position and bellows C will be compressed. The certain pressure to which chamber 24 is initially charged is chosen so that the hydraulic system in which the accumulator is installed will be at a minimum working pressure when the accumulator is empty. For example, in a hydraulic system having a pressure of 3,000 psi and a minimum working pressure of 2,000 psi, the precharge gas pressure in chamber 24 should be 2,000 psi. That is, the precharge pressure would be sufficient to exert a pressure of 2,000 psi when hydraulic fluid chamber 26 is almost empty. If system pressure is above 2,000 psi, bellows C will expand and piston B will move toward the shadow line position. This will compress the gas in chamber 24 so that it will be at substantially the same pressure as system pressure depending upon the force required to expand bellows C.

It will be recognized that the interior of bellows 42 and disc 40 are open to atmospheric pressure through openings 50 and 52 in sleeve 44. When chamber 24 is not charged, spring 54 will normally bias stem D in a first direction inward relative to chamber 24 so that red band 56 is visible through opening 52. This provides a visible indication that the accumulator is not charged. When air or gas is supplied to chamber 24 to provide the predetermined desirable precharge pressure, such pressure acts against disc 40 to shift stem D outward relative to chamber 24 against the biasing force of spring 54 so that red band 56 moves out of the viewing location defined by openings 52, and green band 58 moves into the viewing location so that it is visible through openings 52. Thus, green band 58 provides a ready visible indication that the accumulator is charged to a desirable predetermined pressure.

It will be recognized that the device is constructed so that green band 58 is always visible through openings 52 as long as chamber 24 is at or above its desirable 52 precharge pressure. For example, where pressure chamber 24 is precharged to 2,000 psi, green band 58 is always visible through openings 52 when the pressure is at or above 2,000 psi. If chamber 24 is not charged to its desirable predetermined pressure, or leaks after being charged, green band 58 will move out of view through openings 52, and red band 56 will move into view for indicating an underpressure condition.

It will be recognized that the preferred and most desirable form of the invention has been described in the foregoing specification and shown in the accompanying drawing. However, it will be recognized that other less desirable arrangements are also possible within the scope of the invention. For example, it is possible to provide only green band 58 on stem D. When green band 58 is visible through openings 52, it would tell that the accumulator is charged to the desirable pressure. When green band 58 is not visible through openings 52, its absence from vision would simply tell that the accumulator is not charged. Likewise, it is possible to omit green band 58 and to provide only red band 56. The presence of red band 56 in alignment with openings 52 would then tell that the accumulator is not charged, while the absence of red band 56 from alignment with openings 52 would simply tell that the accumulator was charged. Many other arrangements are also possible. For example, tube D may be pinched off in the area of red band 56, and red band 56 would be omitted. The surface of sleeve opening 50 could be painted or coated in a red color. As green band 58 moved out of alignment with openings 52, the absence of any portion of stem D in alignment with openings 52 would cause the red color on the surface of sleeve opening 50 to be visible. In arrangements having only one band or signal for positively indicating one condition, the absence of the signal from view actually provides the second signal to indicate the other condition.

With the foregoing in mind, it will be recognized that pressure chamber 24 is chargeable to a desirable predetermined minimum pressure condition from an underpressure condition, and is subject to an underpressure condition in the event of leakage of the precharge. Stem D defines a movable visible indicator means which includes signal means defined by bands 56 and 58 which are positionable in a viewing location defined by lateral openings 52 in sleeve 44. The signal means is provided for indicating at least one of the pressure conditions. The indicator means is movable under influence of that one condition for positioning the signal means in the viewing location and is movable under influence of the other of the pressure conditions for positioning the signal out of the viewing location. In the preferred arrangement as described, the signal means selectively indicates both the predetermined and underpressure condition. Although stem D moves inward relative to chamber 24 under the biasing force of spring 54, such movement actually takes place under the influence of an underpressure condition within chamber 24. Thus, in the absence of the desirable predetermined pressure within chamber 24, stem D moves to make red signal 56 visible through openings 52. Stem D moves in its opposite direction under the influence of the desirable predetermined pressure within chamber 24 to make green signal band 58 visible through lateral openings 52. Although different color bands are a preferred form of signal, it is obvious that other types of visible markings or printing can also be provided. The two different signals are simply indicative of the absence of the desirable predetermined pressure in chamber 24 or of the existence of the predetermined desirable pressure within chamber 24. The arrangement whereby the indicator is a common element with the tube through which chamber 24 is charged with pressure makes the device very inexpensive to manufacture and assemble. The highly simplified manner of mounting stem D on a small metal bellows 42 makes the indicator very easy to assemble. The small number of parts used for the indicator makes it very reliable in operation.

Each of bands 56 and 58 preferably has a width longitudinally of stem D which is at least as great as the longitudinal width of openings 52. In a preferred form, each band 56 and 58 has a width greater than the width of openings 52, or the bands are longitudinally spaced from one another, to provide some tolerance for assembly and to insure that red band 56 will definitely not be visible through openings 52 unless there is an under-pressure condition.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A hydraulic accumulator including a vessel having a movable diaphragm separating said vessel into a gas pressure chamber and a hydraulic chamber, a port in said vessel communicating with said hydraulic chamber, a biased visible indicator means movably attached to said vessel and communicating with said gas pressure chamber for indicating absence of or existence of a predetermined pressure in said gas pressure chamber, said indicator means including an elongated selectively hollow tube through which said gas pressure chamber is charged to said predetermined pressure, and said biased tube providing the only access opening in said vessel to said gas pressure chamber.

2. The accumulator of claim 1 wherein said gas pressure chamber is charged to said predetermined pressure and said biased tube has an outer end pinched closed.

3. The accumulator of claim 1 wherein said visible indicator means comprises different color bands on the outer end portion of said biased tube, and a sleeve surrounding said outer end portion and having at least one lateral opening therein through which said bands are selectively visible.

4. The accumulator of claim 1 and including a disc secured to the inner end of said biased tube, a bellows secured to said disc and to an inner surface of said vessel in surrounding relationship to the inner end portion of said tube, and a coil spring surrounding said inner end portion of said tube inside said bellows and bearing against said disc and the inner surface of said vessel.

5. The accumulator of claim 1 wherein said diaphragm comprises a movable piston having a bellows secured thereto and to one end of said vessel, said port being in said one end of said vessel, and said visible indicator means being on the other end of said vessel.

6. A pressure device having a pressure chamber, movable visible indicator means for indicating absence of or existence of a predetermined pressure in said chamber, said indicator means having first and second different signals respectively indicative of the absence and existence of said predetermined pressure, said indicator means being movable for positioning said first signal in a viewing location in the absence of said predetermined pressure and being movable for positioning said second signal in a viewing location under influence of said predetermined pressure, said indicator means including an elongated stem having inner and outer end portions, said signals being located on said outer end portion, a disc secured to the inner end of said stem, a bellows secured to said disc and to an inner surface of said vessel in surrounding relationship to said inner end portion, and biasing means for biasing said stem inwardly relative to said pressure chamber, said stem being hollow and the only access opening in said pressure device for selectively filling the pressure chamber to said predetermined pressure.

7. The device of claim 6 wherein said biasing means comprises a coil spring inside said bellows bearing against said disc and the inner surface of said vessel.

8. The device of claim 7 wherein said chamber is charged to said predetermined pressure and the outer end of said tube is pinched closed.

9. The device of claim 8 and including a sleeve surrounding the outer end portion of said tube in protecting relationship thereto, said sleeve having at least one lateral opening through which said signals are selectively visible while in the viewing location.

* * * * *